| United States Patent [19] | [11] 3,885,045 |
| --- | --- |
| Maillard | [45] May 20, 1975 |

[54] THERAPEUTIC COMPOSITION CONTAINING 1-(2-HYDROXY-2-INDANYL)-PROPYLAMINE

[75] Inventor: Jacques Georges Maillard, Paris, France

[73] Assignee: Laboratoires Jacques Logeais, Issy-les-Moulineaux, France

[22] Filed: July 19, 1973

[21] Appl. No.: 380,542

[30] Foreign Application Priority Data

July 20, 1972  France .............................. 72.26162

[52] U.S. Cl. .............................................. 424/330
[51] Int. Cl.² ........................................ A61K 27/00
[58] Field of Search ..................................... 424/330

[56] References Cited
UNITED STATES PATENTS

| 2,982,783 | 5/1961 | Schenck et al. | 424/330 |
| 3,072,716 | 1/1963 | Heubner | 424/330 |
| 3,505,404 | 4/1970 | Petersen et al. | 424/330 |
| 3,657,440 | 4/1972 | Werner | 424/330 |

OTHER PUBLICATIONS

Maillard et al., Chemical Abstracts, 67:108578S (1967).

*Primary Examiner*—Stanley J. Friedman
*Assistant Examiner*—Norman A. Drezin
*Attorney, Agent, or Firm*—Cooper, Dunham, Clark, Griffin & Moran

[57] ABSTRACT

This invention relates to a therapeutic composition having particularly an anoretic and lipolytic activity comprising, as active ingredient, 1-(2-hydroxy-2-indanyl)-propylamine or a therapeutically administrable salt thereof.

6 Claims, No Drawings

THERAPEUTIC COMPOSITION CONTAINING 1-(2-HYDROXY-2-INDANYL)-PROPYLAMINE

This invention relates to therapeutic compositions having anorectic and lipolytic activity comprising 1-(2-hydroxy-2-indanyl)-propylamine or a pharmaceutically acceptable salt thereof.

1-(2-Hydroxy-2-indanyl)-propylamine is a known chemical compound (J. Maillard, M. Vincent, M. Rapin, Vo Van Tri and G. Remond, Bull. Soc. Chim., 1967, 2110).

It may be obtained from indan-2-one cyanohydrin, the OH of which is protected by pyranylation, by action of an ethylmagnesium halide, hydrolysis, followed by reduction with lithium aluminum hydride and depyranylation by acid hydrolysis, according to the following scheme:

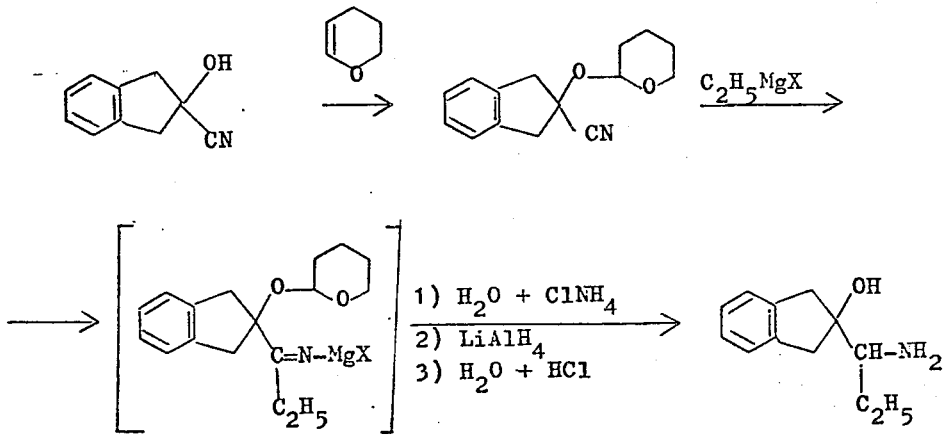

The base is a white crystalline solid, M.p. = 98°–99°C.

This compound has been disclosed as having no particular pharmacological activity.

Applicant has now found that 1-(2-hydroxy-2-indanyl)-propylamine and its therapeutically acceptable salts possess useful anoretic and lipolytic properties.

The more commonly employed therapeutically useful anoretics are phenethylamines and particularly amphetamine derivatives, which exhibit two major drawbacks:

they are strong stimulants of the central nervous system;

they produce an acceleration of the heart rhythm.

On the other hand, in view of the fact that they are active at the level of the central nervous system, the weight loss they produce is predominantly related to a decrease of appetite, without substantial influence at the level of the adipose tissues.

In contrast, 1-(2-hydroxy-2-indanyl)-propylamine possesses both anoretic and lipolytic properties evidenced in rat and in the adipose tissues in vitro. Moreover, its effects on the central nervous system and the cardiovascular system are negligible. This material was found to be more sedative than stimulant and the only manifest cardiac activity is a protection against some types of experimental arrhythmias in animals.

The pharmacological and toxicological tests reported below were conducted with 1-(2-hydroxy-2-indanyl)-propylamine hydrochloride.

1. Anoretic action in rats (cf. R. CHAILLET and coworkers, Arch. Int. Pharmaco., 1966, 144, 451)

Lots of 6 male rats weighing 140–160 g are placed in individual cages and are fasted during 48 hours, while being allowed to drink at will. The material is administered orally, 30 minutes prior to the test. The food, which is offered to the animals in feeding-troughs, is weighed every hour during 6 hours. For each lot of animals, the food intake is calculated per 100 g of body weight and is compared every hour with the food intake of a reference lot.

Results:

30 mg/kg 30% decrease of food intake - period of time: 1 hour 60 mg/kg 25–30% decrease of food intake - period of time: 6 hours Throughout the testing time, the animals retain a behavior and an activity identical with those of the controls.

2. Lipolytic action In vivo:

The test material is injected subcutaneously to male and female rats weighing 170–180 g (5–15 animals per dosage level). Blood samples are taken after decapitation, 60 minutes after the injection. The fatty acids released by lipolysis are assayed in the heparinized plasma, according to the conventional technique of DUNCOMBE.

| Dosage | Free fatty acid level (micromoles/ml) | | % with respect to the control animals |
|---|---|---|---|
| | treated animals | control animals | |
| 10 mg/kg | 284 ± 55 | 325 ± 27 | − 12.6 |
| 30 mg/kg | 262 ± 30.7 | 192 ± 14 | + 36 |
| 100 mg/kg | 354 ± 21.7 | 232 ± 24 | + 54 |

Thus, the lipolytic action starts at 30 mg/kg.

In vitro:

200 mg of epididymal fat of a fasting 200 g male rat are incubated at 37°C, with stirring, in a KREBS-RINGER buffer solution containing 4% albumin. The test comprises:

a control incubated with the buffer solution;

a control containing noradrenalin at a concentration of $10^{-5}$M;

the test with the test material, at various concentrations.

The fatty acids released are assayed on 0.5 ml by the technique according of DUNCOMBE.

| Compound added | Concentration | Free fatty acids (micromoles/g of tissue/hour) |
|---|---|---|
| — | — | 2.63 |
| noradrenalin | $10^{-5}$M | 9.43 |
| test material | $10^{-8}$M | 2.03 |
| test material | $10^{-7}$M | 3.97 |
| test material | $10^{-6}$M | 4.26 |
| test material | $10^{-5}$M | 4.70 |

Thus, the test material possesses a substantial lipolytic activity from a level of $10^{-7}$M.

3. Actions on the central nervous system

Spontaneous activity of mice grouped in lots of 12, measured between 25 and 35 minutes after administration of the test material.

| Oral administration | % variation with respect to the controls |
|---|---|
| 25 mg/kg | − 6.7% |
| 50 mg/kg | − 29 % |
| 100 mg/kg | − 44 % |
| Intraperitoneal administration | % variation with respect to the controls |
| 25 mg/kg | − 20 % |
| 50 mg/kg | − 46 % |
| 100 mg/kg | − 75 % |

Pulling test (cf. S. COURVOISIER, J. Clin. Exp. Psychopath., 1956, 17, 25) for the determination of the agility and coordination of the motions of mice suspended to a wire by the fore-paws: no action at 60 mg/kg I.P.

Turning rod test: no action at 60 mg/kg.

Anticonvulsant action (mice): no protection against electric shock at 25 mg/kg I.P.

Protection against restraint ulcers (rats): none at 60 mg/kg I.P.

Potentiation of barbiturate induced sleep in mice given a non-hypnotic dose of nembutal (25 mg/kg I.P.): substantially none at 50 mg/kg I.P.

Analgesia (mice): D'AMOUR and SMITH tests (J. Pharmacol. Exp. Ther., 1941, 72, 74) and KOSTER test (E. KOSTER and M. ANDERSON, Fed. Proc., 1959, 18, 412): no action at 60 mg/kg I.P. or per os.

4. Cardiovascular actions

Protection against extra-systoles and ventricular tachycardia induced in rat by injection of aconitin nitrate: at 30 mg/kg, the test material protects almost completely the test animals against said symptoms.

Protection against heart fibrillation induced in mice by immersion in a chloroform-saturated atmosphere: none.

Electro-systolic entrainment in rabbits: a double electric probe is introduced in the vena cava at the level of the right auricle and the electric entrainment of the heart is set at a frequency 5% above normal. By gradually increasing the frequency, the maximum value which may be followed by the heart is tested at 5 minute intervals and checked with an oscilloscope. At a dosage of 60 mg/kg by the duodenal route, the test material decreases by a factor of 50% the maximum frequency followed, with respect to the normal value (decrease of cardiac excitability).

5. Recording of blood pressure, of the electrocardiogram, of the frequency and of the heart rate of flow and of the femoral rate of flow in nembutal-anesthetized dog: no change of said parameters is found to occur up to a dosage of 5 mg/kg I.V. of the test material. From a dosage of 5 mg/kg I.V., a slight decrease of the carotid blood pressure is noted.

5. Absence of choleretic (in rats), diuretic (in rats) and antihistaminic (in guinea-pigs) actions

| TOXICITY | | |
|---|---|---|
| Acute toxicity, by the I.P. route: | mice : | 185 mg/kg |
| | rats : | 165 mg/kg |
| by the oral route: | mice : | 450 mg/kg |
| | rats : | 540 mg/kg |
| Chronic toxicity: | | |

Male rats weighing 80–100 g are given the test material in admixture with food, at a rate of 100, 30 and 10 mg of test material per day.

Ten rats were used at each dosage level. Mice were treated in a similar manner (10 animals per dosage level).

Samples of blood and organs were taken after 4, 8 and 12 weeks and the results obtained were compared with those obtained with reference animals. The glycemia, uremia, cholesterolemia, calcemia, phosphoremia, proteinemia and albuminemia levels and the histologic examinations of the kidneys, the suprarenal glands, the livers, the pancreas, the spleens, the hearts, the lungs, the thymus glands and the testicles are substantially normal in all the treated animals.

In contrast, the free fatty acid level in the blood plasma is strongly increased in the treated animals, even at 10 mg/kg. The food intake of the treated animals is substantially less than that of the controls.

In addition, rats given 5 times a week, during 6 weeks, 60 mg/kg of test material suspended in carboxymethylcellulose and administered by esophageal tube have shown normal biological constants and organs.

The clinical tests carried out confirmed the results of the pharmacologic experiments.

The test material was administered to patients in the form of tablets containing 50 or 100 mg active material, at a rate of 100–500 mg/day. After 2–6 days of treatment with 150 mg/day, all subjects displayed a distaste for food and a weight loss of 1–3 kg. No phenomenon of intolerance was noted up to dosages of 500 mg/day.

The test material has a definite therapeutic usefulness in the treatment of obesity without any fear of troublesome nervous or cardiovascular manifestations.

The therapeutic composition according to the invention may be advantageously administered orally, particularly in the form of capsules or tablets containing 20–200 mg active ingredient.

Examples of suitable formulation are given below a - Tablets containing 1-(2-hydroxy-2-indanyl)-propylamine (base)
    1-(2-hydroxy-2-indanyl)-propylamine (base)    80 mg
    Starch    200 mg b - Capsules containing 1-(2-hydroxy-2-indanyl)-propylamine (base)
    1-(2-hydroxy-2-indanyl)-propylamine (base)    200 mg
    Lactose    25 mg -Continued

| | |
|---|---|
| Magnesium stearate | 2 mg |
| c - Capsules containing 1-(2-hydroxy-2-indanyl)-propylamine hydrochloride | |
| 1-(2-hydroxy-2-indanyl)-propylamine hydrochloride | 120 mg |
| Magnesium stearate | 2 mg |
| Polyvinyl pyrrolidone | 3 mg |
| Talc | 10 mg |

Having now described my invention, what I claim as new and desire to secure by Letter Patent is:

1. A method for the treatment of obesity which comprises administering to an obese host a pharmaceutical composition containing an anoretically effective quantity of a compound selected from the group consisting of 1-(2-hydroxy-2-indanyl)-propylamine and the pharmaceutically acceptable salts thereof.

2. A method as in claim 1 wherein the compound is administered orally.

3. A method as in claim 2 wherein the compound is administered as a composition containing from 20 to 200 mg of the compound.

4. A method as in claim 3 wherein the composition is in the form of a capsule.

5. A method as in claim 3 wherein the composition is in the form of a tablet.

6. A method as in claim 1 wherein the compound is 1-(2-hydroxy-2-indanyl)-propylamine.

* * * * *